US010657387B2

(12) United States Patent
Ji et al.

(10) Patent No.: US 10,657,387 B2
(45) Date of Patent: May 19, 2020

(54) METHOD AND APPARATUS FOR CONTROLLING VISION SENSOR FOR AUTONOMOUS VEHICLE

(71) Applicant: Samsung Electronics Co., Ltd., Suwon-si (KR)

(72) Inventors: Dae Hyun Ji, Hwaseong-si (KR); Dokwan Oh, Suwon-si (KR); Dongwook Lee, Hwaseong-si (KR); Jaewoo Lee, Hwaseong-si (KR); Cheolhun Jang, Pohang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 15/472,517

(22) Filed: Mar. 29, 2017

(65) Prior Publication Data
US 2018/0060675 A1    Mar. 1, 2018

(30) Foreign Application Priority Data

Sep. 1, 2016    (KR) .................. 10-2016-0112452

(51) Int. Cl.
*G06K 9/00*    (2006.01)
*G06K 9/20*    (2006.01)
(Continued)

(52) U.S. Cl.
CPC ....... *G06K 9/00791* (2013.01); *G05D 1/0246* (2013.01); *G06K 9/2027* (2013.01);
(Continued)

(58) Field of Classification Search
CPC . G06K 9/00791–00825; G06K 9/2027; G05D 1/0246
See application file for complete search history.

(56) References Cited

U.S. PATENT DOCUMENTS 8,526,677 B1 *    9/2013    Crichton ................. G06T 7/593
                                                         382/103
9,840,256 B1 *    12/2017    Valois .................. G05D 1/0231
(Continued)

FOREIGN PATENT DOCUMENTS

DE    102013020947 A1    6/2015
EP    1871093 A1    12/2007
(Continued)

OTHER PUBLICATIONS

Extended European search report dated Oct. 18, 2017 in corresponding European Patent Application No. 17162892.8 (9 pages in English).

(Continued)

*Primary Examiner* — Robert J Hance
(74) *Attorney, Agent, or Firm* — Sughrue Mion, PLLC

(57) ABSTRACT

A method and apparatus for controlling a vision sensor are provided. The apparatus and corresponding method are configured to predict an expected point, on a traveling path of a host vehicle, at which an illumination variation greater than or equal to a threshold is expected to occur, and determine whether the host vehicle is located within a threshold distance. The apparatus and corresponding method are also configured to control a vision sensor in the host vehicle based on the expected illumination variation in response to the host vehicle being located within the threshold distance.

37 Claims, 11 Drawing Sheets

(51) Int. Cl.
  *H04N 5/235*  (2006.01)
  *H04N 5/238*  (2006.01)
  *G05D 1/02*   (2020.01)
  *G01C 21/26*  (2006.01)
  *G01S 19/42*  (2010.01)

(52) U.S. Cl.
  CPC ........... *H04N 5/238* (2013.01); *H04N 5/2351* (2013.01); *H04N 5/2355* (2013.01); *G01C 21/26* (2013.01); *G01S 19/42* (2013.01)

(56) References Cited

U.S. PATENT DOCUMENTS

| | | | | |
|---|---|---|---|---|
| 2006/0255246 | A1* | 11/2006 | Hetherington | A63H 19/24 250/216 |
| 2007/0024467 | A1* | 2/2007 | Fujii | G06K 9/00791 340/937 |
| 2008/0043099 | A1* | 2/2008 | Stein | B60Q 1/143 348/118 |
| 2010/0259824 | A1* | 10/2010 | Mitsuhashi | G02B 5/205 359/585 |
| 2010/0321496 | A1* | 12/2010 | Ulbricht | B60Q 1/1423 348/148 |
| 2011/0221933 | A1 | 9/2011 | Yuan et al. | |
| 2017/0267178 | A1* | 9/2017 | Shiga | B60R 11/02 |

FOREIGN PATENT DOCUMENTS

| | | | |
|---|---|---|---|
| JP | 9-205645 | A | 8/1997 |
| JP | 2005-123832 | A | 5/2005 |
| JP | 2005-167842 | A | 6/2005 |
| JP | 2008-126905 | A | 6/2008 |
| JP | 4325642 | B2 | 9/2009 |
| JP | 4757932 | B2 | 8/2011 |
| JP | 5696927 | B2 | 4/2015 |
| KR | 10-0488728 | B1 | 5/2005 |
| KR | 10-1154552 | B1 | 6/2012 |
| KR | 10-2012-0071192 | A | 7/2012 |
| KR | 10-1355076 | B1 | 1/2014 |
| KR | 10-2014-0075504 | A | 6/2014 |
| KR | 10-1414572 | B1 | 8/2014 |
| KR | 10-2014-0109011 | A | 9/2014 |

OTHER PUBLICATIONS

Communication dated Apr. 10, 2019, issued by the European Patent Office in counterpart European Application No. 17 162 892.8.

Fumio Okura, et al., "Full Spherical High Dynamic Range Imaging from the Sky", Jul. 9, 2012, 2012 IEEE International Conference on Multimedia and Expo, XP032235696, 8 pages total.

\* cited by examiner

FIG. 7
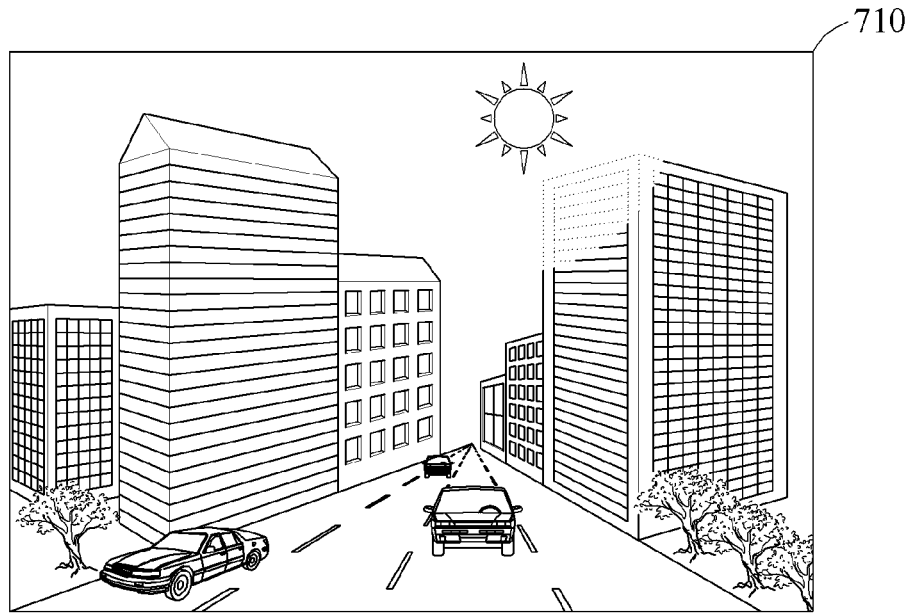
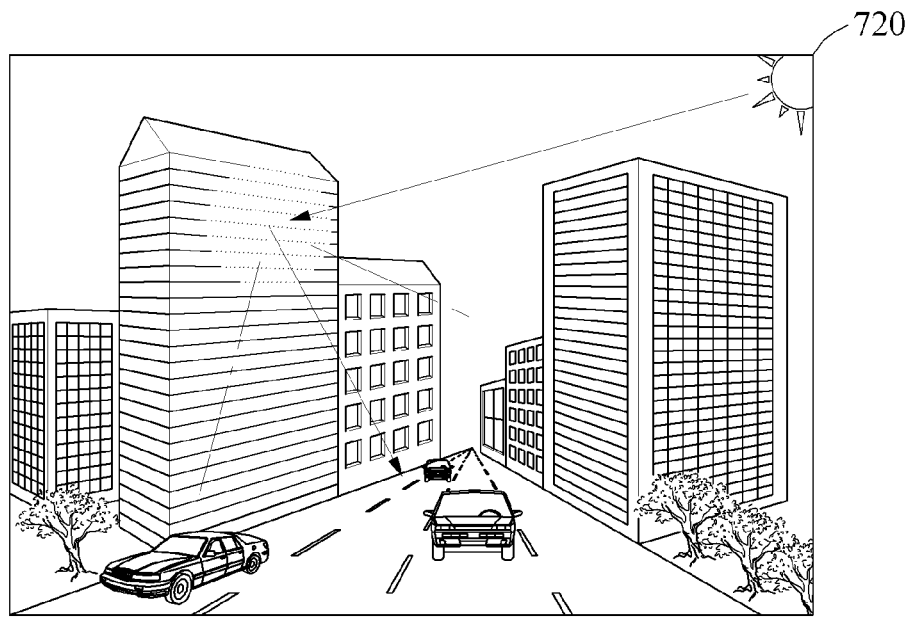

FIG. 9
910
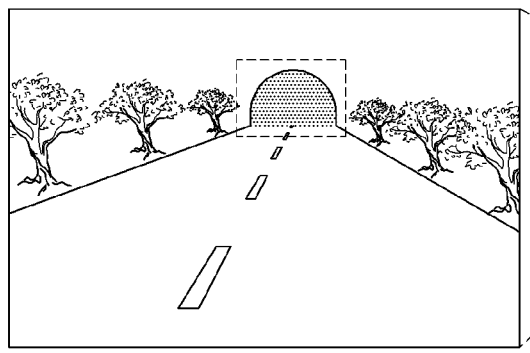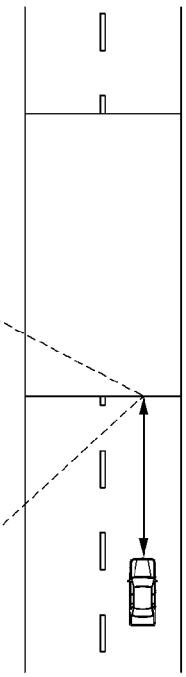
920
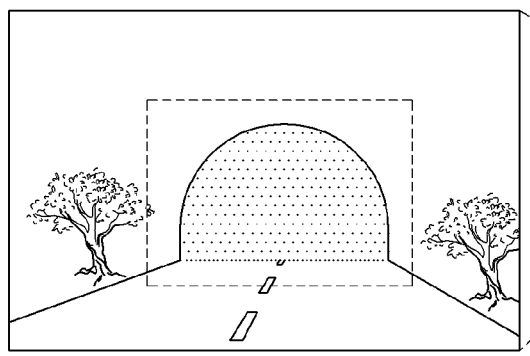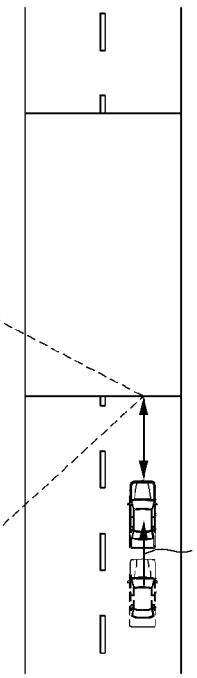
Traveling speed

METHOD AND APPARATUS FOR CONTROLLING VISION SENSOR FOR AUTONOMOUS VEHICLE

CROSS-REFERENCE TO RELATED APPLICATION(S)

This application claims the benefit under 35 USC § 119(a) of Korean Patent Application No. 10-2016-0112452, filed on Sep. 1, 2016, in the Korean Intellectual Property Office, the entire disclosure of which is incorporated herein by reference for all purposes.

BACKGROUND

1. Field

The following description relates to a method and apparatus to control a vision sensor of an autonomous vehicle.

2. Description of Related Art

Autonomous driving of a host vehicle enables various driving operations to be automatically performed. For example, an autonomous vehicle independently travels on a road without user intervention or without a driver operating the vehicle through a steering wheel, an accelerator pedal, or a brake. For autonomous driving of a vehicle, a technology to automatically maintain a distance between vehicles, a technology to provide a notification of whether a vehicle keeps or moves out of a lane, or a technology to provide a notification of an object detected in a rear side or a side may be used. Various technologies for autonomous driving may be performed based on information on images that surround the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method to control a vision sensor, including: predicting an expected point, on a traveling path of a host vehicle, at which an illumination variation greater than or equal to a threshold is expected to occur; determining whether the host vehicle is located within a threshold distance; and controlling a vision sensor in the host vehicle based on the expected illumination variation in response to the host vehicle being located within the threshold distance.

The predicting of the expected point may include predicting the expected point based on any one or any combination of any two or more of an image captured by the vision sensor, map data of the traveling path, global positioning system (GPS) coordinates of a current location of the host vehicle during traveling, and a traveling speed of the host vehicle.

The predicting of the expected point may include predicting the expected point based on a similarity between an image captured by the vision sensor and a pre-trained image representing the expected point.

The predicting of the expected point may include: recognizing either one or both of an entry point and an exit point of a tunnel on the traveling path; and predicting either one or both of the entry point and the exit point as the expected point.

The recognizing of either one or both of the entry point and the exit point may include either one or both of: recognizing the entry point based on any one or any combination of any two or more of an image captured by the vision sensor, map data of the traveling path, and GPS coordinates of a current location of the host vehicle during traveling; and recognizing the exit point based on any one or any combination of any two or more of the image captured by the vision sensor, the map data, and a traveling speed of the host vehicle.

The recognizing of the entry point may include either one or both of: recognizing the entry point based on whether the image may include a predetermined shape of an entrance of the tunnel; and recognizing the entry point based on the map data and the GPS coordinates.

The recognizing of the exit point may include either one or both of: recognizing the exit point based on whether the image may include a predetermined shape of an exit of the tunnel; and recognizing the exit point based on map data matching based on the entry point and the traveling speed.

The determining of whether the host vehicle is located within the threshold distance may include: calculating a depth value of the expected point based on an image captured by the vision sensor; and determining, based on the depth value, whether the host vehicle is located within the threshold distance.

The determining of whether the host vehicle is located within the threshold distance is based on a distance between the expected point and a location of the host vehicle and on a traveling speed of the host vehicle.

The controlling of the vision sensor may include any one or any combination of any two or more of: controlling a sensing parameter of the vision sensor; processing an image captured by the vision sensor; and determining whether to use a filter for the vision sensor.

The controlling of the sensing parameter may include: increasing, in stages, a value of a photosensitivity of the vision sensor based on a distance between the host vehicle and an entry point of a tunnel in response to the entry point being predicted as the expected point; and reducing, in stages, the value of the photosensitivity based on a distance between the host vehicle and an exit point of the tunnel in response to the exit point being predicted as the expected point.

The processing of the image may include performing high dynamic range imaging (HDRI) of the image through tone mapping.

The controlling of whether to use the filter may include: detaching the filter from the vision sensor in response to an entry point of a tunnel being predicted as the expected point; and attaching the filter to the vision sensor in response to an exit point of the tunnel being predicted as the expected point.

The predicting of the expected point may include: determining whether the host vehicle is exposed to a backlight environment; and determining a location of the host vehicle as the expected point based on a result of the determining.

The determining of whether the host vehicle is exposed to the backlight environment may include either one or both of: determining that the host vehicle is exposed to the backlight environment in response to a light intensity measured by an illumination sensor being greater than or equal to a threshold of the backlight environment; and determining that the host vehicle is exposed to the backlight environment in response to an object during daylight being recognized from an image captured by the vision sensor.

In accordance with an embodiment, there is provided a non-transitory computer-readable storage medium storing instructions that, when executed by a processor, cause the processor to perform the method described above.

In accordance with another embodiment, there is provided an apparatus to control a vision sensor, the apparatus including: a processor configured to predict an expected point, on a traveling path of a host vehicle, at which an illumination variation greater than or equal to a threshold is expected to occur, determine whether the host vehicle is located within a threshold distance, and control a vision sensor in the host vehicle based on the expected illumination variation in response to the host vehicle being located within the threshold distance.

The apparatus may also include: a memory configured to store map data of the traveling path; a global positioning system (GPS) sensor configured to measure GPS coordinates of a current location of the host vehicle during traveling; and a speed sensor configured to sense a traveling speed of the host vehicle, wherein the processor is further configured to predict the expected point based on any one or any combination of any two or more of an image captured by the vision sensor, the map data, the GPS coordinates, and the traveling speed.

The processor may be further configured to predict the expected point based on a similarity between an image captured by the vision sensor and a pre-trained image representing the expected point.

The processor may be further configured to recognize either one or both of an entry point and an exit point of a tunnel on the traveling path and to predict either one or both of the entry point and the exit point as the expected point.

The processor may be further configured to perform either one or both of: recognizing the entry point based on any one or any combination of any two or more of an image captured by the vision sensor, map data of the traveling path, and GPS coordinates of a current location of the host vehicle during traveling; and recognizing the exit point based on any one or any combination of any two or more of the image captured by the vision sensor, the map data, and a traveling speed of the host vehicle.

The processor may be further configured to perform either one or both of:
recognizing the entry point based on whether the image may include a predetermined shape of an entrance of the tunnel; and recognizing the entry point based on the map data and the GPS coordinates.

The processor may be further configured to perform either one or both of:
recognizing the exit point based on whether the image may include a predetermined shape of an exit of the tunnel; and recognizing the exit point based on map data matching based on the entry point and a traveling speed of the host vehicle.

The processor may be further configured to calculate a depth value of the expected point based on an image captured by the vision sensor, and to determine, based on the depth value, whether the host vehicle is located within the threshold distance.

The processor may be further configured to determine, based on a distance between the expected point and a location of the host vehicle and on a traveling speed of the host vehicle, whether the host vehicle is located within the threshold distance.

The processor may be further configured to perform any one or any combination of any two or more of: controlling a sensing parameter of the vision sensor; processing an image captured by the vision sensor; and determining whether to use a filter for the vision sensor.

The processor may be further configured to: increase, in stages, a value of a photosensitivity of the vision sensor based on a distance between the host vehicle and an entry point of a tunnel in response to the entry point being predicted as the expected point; and reduce, in stages, the value of the photosensitivity based on a distance between the host vehicle and an exit point of the tunnel in response to the exit point being predicted as the expected point.

The processor may be further configured to perform high dynamic range imaging (HDRI) of the image through tone mapping.

The processor may be further configured to: detach the filter from the vision sensor in response to an entry point of a tunnel being predicted as the expected point; and attach the filter to the vision sensor in response to an exit point of the tunnel being predicted as the expected point.

The processor may be further configured to determine whether the host vehicle is exposed to a backlight environment, and to determine a location of the host vehicle as the expected point based on a result of the determining.

The apparatus may also include: an illumination sensor configured to sense a light intensity, wherein the processor is further configured to perform either one or both of: determining that the host vehicle is exposed to the backlight environment in response to the light intensity measured by the illumination sensor being greater than or equal to a threshold of the backlight environment; and determining that the host vehicle is exposed to the backlight environment in response to an object during daylight being recognized from an image captured by the vision sensor.

In accordance with an embodiment, there is provided a control apparatus of a host vehicle, including: a vision sensor configured to capture an image appearing on a traveling path of the host vehicle; and a processor configured to predict an expected point at which an illumination variation greater than or equal to a threshold occurs, along the traveling path of the host vehicle using any one or any combination of any two or more of the image captured, map data associated with the traveling path of the host vehicle, and global positioning coordinates corresponding to a current location of the host vehicle during traveling, determine whether the host vehicle is located within a threshold distance to control the vision sensor from the expected point, and control the vision sensor based on the expected illumination variation based on the processor determining that the host vehicle is located within the threshold distance.

The processor may compare an image captured by a vision sensor to a pre-trained image trained on an image in a backlight state and determines that the host vehicle is exposed to a backlight environment, without a use of an illumination sensor.

In response to the processor determining that the host vehicle is exposed to the backlight environment, the processor may apply a filter to the vision sensor or performs a backlight compensation to adjust a value of a photosensitivity of the vision sensor.

The processor may adjust a value of a photosensitivity of the vision sensor based on a distance between the host vehicle and the expected point.

The processor may include: a controller comprising a parameter adjuster configured to generate a control signal to adjust parameters of the vision sensor and control the vision sensor, and a filter controller configured to generate a signal to control whether to attach or detach a filter for the vision sensor and to control the vision sensor.

Other features and aspects will be apparent from the following detailed description, the drawings, and the claims.

BRIEF DESCRIPTION OF THE DRAWINGS

FIG. 7 illustrates examples of backlight environments.

FIG. 9 illustrates another example of a method to determine whether a host vehicle is located within a threshold distance.

Figure 1:
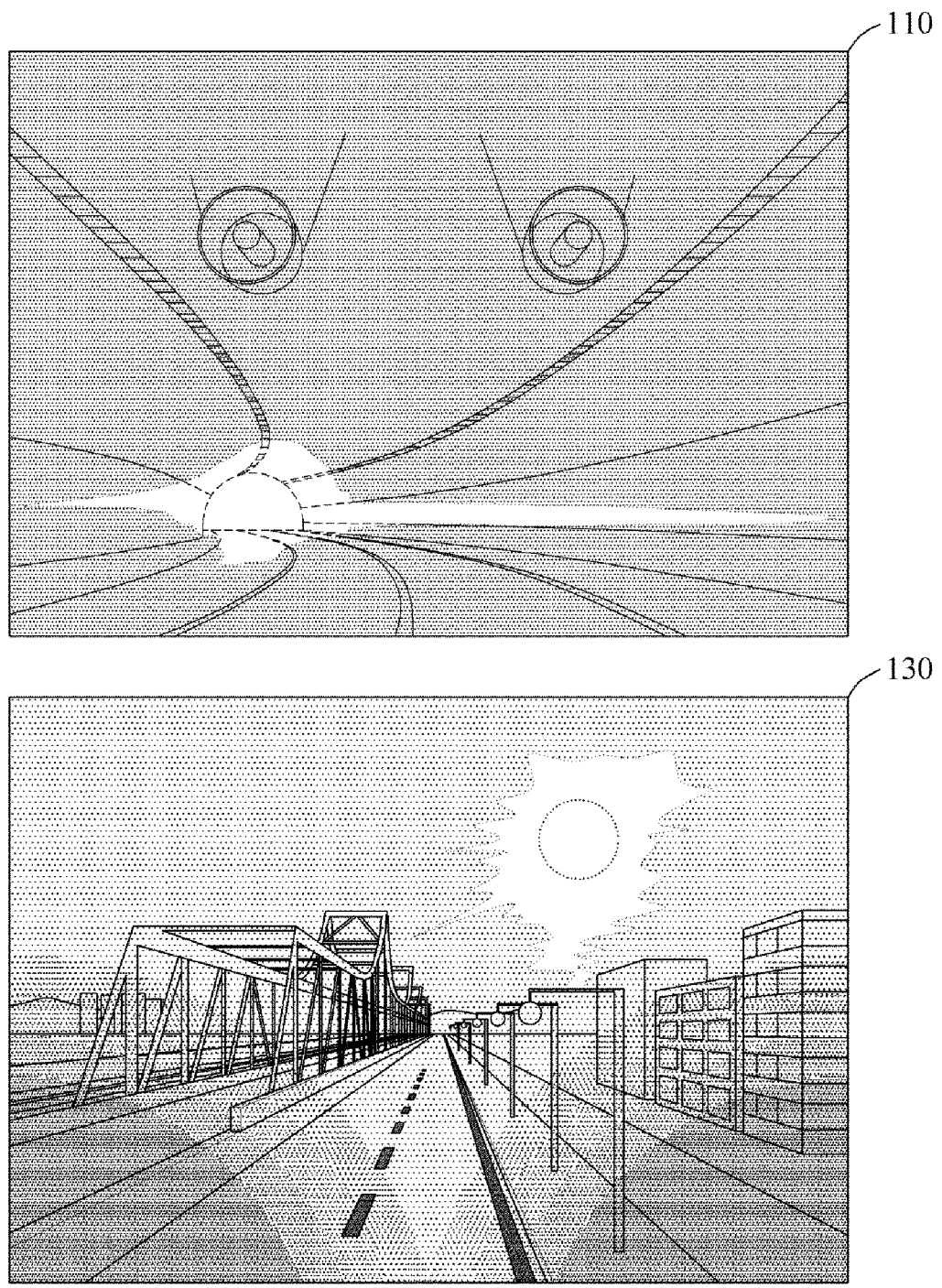
FIG. 1 illustrates an example to control a vision sensor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The term "similar" or "similarity" includes, but it is not limited to, having a likeness or resemblance, especially in a general way, images having the same shape; having corresponding sides proportional and corresponding angles equal.

Due to manufacturing techniques and/or tolerances, variations of the shapes shown in the drawings may occur. Thus, the examples described herein are not limited to the specific shapes shown in the drawings, but include changes in shape that occur during manufacturing.

In the following description, examples may be used to enhance a performance of a vision sensor in an environment in which a vehicle is operating, for example, a tunnel, in which a light intensity varies. For example, examples may be applicable to a camera or a vision sensor that may be included in an autonomous vehicle, an intelligent vehicle, a wearable device, a smartphone or a mobile device, which are to be operated, partly or wholly, without user intervention. Hereinafter, examples will be described in detail below with reference to the accompanying drawings, and like reference numerals refer to the like elements throughout.

FIG. 1 illustrates an example to control a vision sensor. In FIG. 1, an image 110 is captured by an image sensor or a camera positioned inside or on a host vehicle as the host vehicle travels toward an exit of a tunnel during autonomous driving, and an image 130 is captured when the host vehicle is exposed to a backlight environment. The backlight environment refers to an environment in which an image of an object is blurred due to direct incident light from the sun on a vision sensor of the host vehicle in addition to light reflected from an object or a subject to be captured.

For example, when the host vehicle travels toward the exit of the tunnel, as shown in the image 110 of FIG. 1, a sudden illumination variation occurs between a darkness inside the tunnel and a light outside of the tunnel. Also, when the host vehicle travels while facing the sun, as shown in the image 130 of FIG. 1, the sun is projected onto a subject from behind. In an embodiment, the terms "light intensity" and "illumination" may be interchangeably used with respect to each other, and accordingly a variation in a light intensity refers to an illumination variation.

When the sudden illumination variation occurs at the end of the tunnel, it is difficult to recognize an object, for example, a pedestrian, a traffic light, a counterpart vehicle or a lane on a traveling path right outside or at a close proximity (within 50 feet, for example) of the end of the tunnel, even though a front side of the host vehicle is captured using a capturing device (for example, a vision sensor or the camera) included inside or on the host vehicle. Also, a risk of an accident greatly increases. As a result, a safe maneuvering and travel of the host vehicle becomes impossible.

Thus, it is possible to prevent a sharp fall in a recognition rate of the capturing device inside or on the host vehicle by including a processor or controller, separate from or integral to capturing device, within the host vehicle configured to predict a sudden illumination variation and to control the capturing device in advance.

Figure 2:
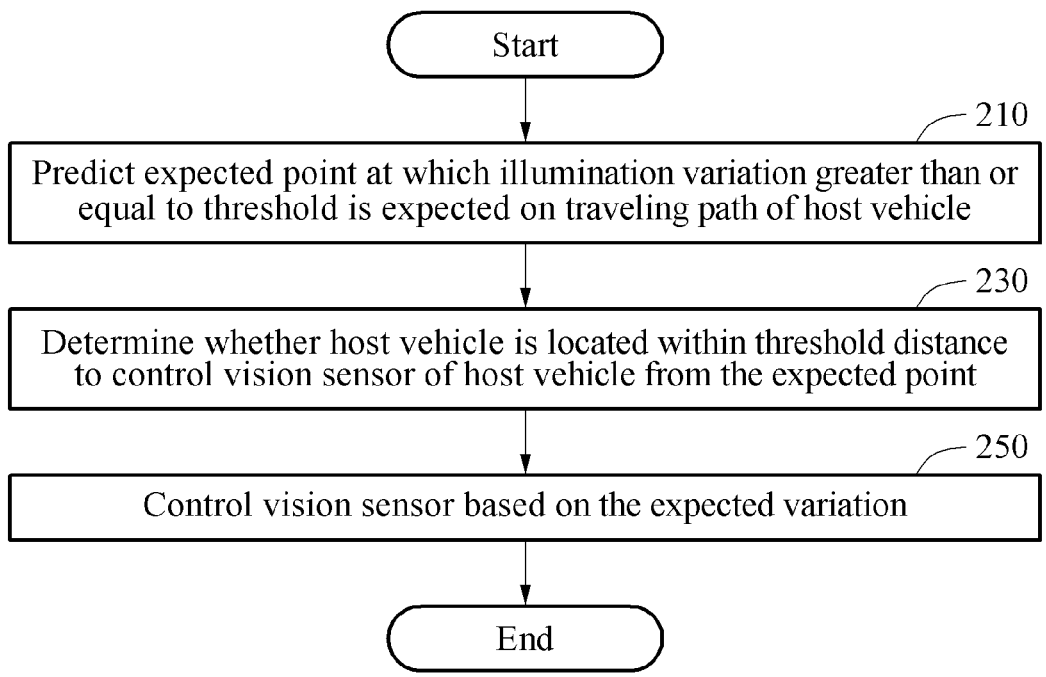
FIG. 2 is a flowchart illustrating an example of a method to control the vision sensor.

FIG. 2 is a flowchart illustrating an example of a method to control the vision sensor. Referring to FIG. 2, in operation 210, an apparatus to control a vision sensor (hereinafter, referred to as a "control apparatus") predicts an expected point at which an illumination variation greater than or equal to a threshold is expected, on a traveling path of a host vehicle. For example, the control apparatus predicts the expected point based on at least one of an image captured by the vision sensor, map data associated with the traveling path, global positioning system (GPS) coordinates corresponding to a current location of the host vehicle during traveling, or a traveling speed of the host vehicle.

The "expected point" is a point at which the host vehicle cannot recognize the object in the captured image due to a sudden illumination variation, and includes, for example, a point (for example, a position or a location defined by an exit of a tunnel) at which a vehicle moves from a dark surrounding to a bright surrounding (or to a surrounding including an amount of light or a brightness greater than the dark surrounding), a point (for example, a position or a location defined by an entrance of a tunnel) at which a vehicle moves from a bright surrounding to a dark surrounding (or to a surrounding including an amount of light or a brightness greater than the dark surrounding), or a point at which a vehicle is exposed to a backlight effect, surrounding, or environment in which an image of an object is blurred due to direct incident light from the sun on a vision sensor of the host vehicle, in addition to light reflected from a subject to be captured.

Because the host vehicle is exposed to the backlight environment before reaching an actual exit of a tunnel, the "expected point" does not exactly match the exit. Hereinafter, a point, a position, or a location that is near to an exit of a tunnel and at which an illumination variation is expected to be greater than or equal to a threshold is referred to as an "exit point of the tunnel," and a point, a position, or a location that is near to an entrance of the tunnel and at which an illumination variation is expected to be greater than or equal to a threshold is referred to as an "entry point of the tunnel."

The "threshold" corresponds to, for example, a value representing an illumination variation which makes it difficult for the control apparatus to recognize an object in the vision sensor. For example, the threshold is set based on a weather, or a time slot, for example, daytime or nighttime.

For example, the control apparatus recognizes at least one of the entry point or the exit point of the tunnel on the traveling path of the host vehicle, and predicts at least one of the entry point or the exit point as the expected point. A method by which the control apparatus recognizes the entry point and the exit point of the tunnel will be described with reference to FIGS. 3, 4 and 5.

The control apparatus analyzes an image captured by the vision sensor based on a model pre-trained on the expected point, and predicts at least one of the entry point or the exit point as the expected point. The model includes, for example, a deep neural network trained based on various images including shapes of FIGS. 4 and 5.

Also, the control apparatus determines whether the host vehicle is exposed to the backlight environment, and determines a location of the host vehicle as the expected point based on a determination result. Examples in which the host vehicle is exposed to the backlight environment will be described with reference to FIGS. 6 and 7.

Objects recognized in an image recognition-based autonomous driving scheme are classified into, for example, a lane class, a vehicle class, or a pedestrian class. According to examples, a tunnel entrance class, a tunnel exit class, a sun class, or various combinations thereof, are added as a class to classify objects recognized from an image captured by the vision sensor.

In operation 230, the control apparatus determines whether the host vehicle is located within a threshold distance from the expected point. The "threshold distance" is a minimum distance used to control the vision sensor of the host vehicle. Examples of determining whether the host vehicle is located within the threshold distance will be described with reference to FIGS. 8 and 9.

In operation 250, the control apparatus controls the vision sensor based on the expected illumination variation, in response to the host vehicle being determined to be located within the threshold distance in operation 230. For example, the control apparatus is a structural or hardware apparatus including a programed software scheme in a controller therein to control the vision sensor based on the expected illumination variation. An example in which the control apparatus controls the vision sensor will be described with reference to FIG. 10.

Figure 3:
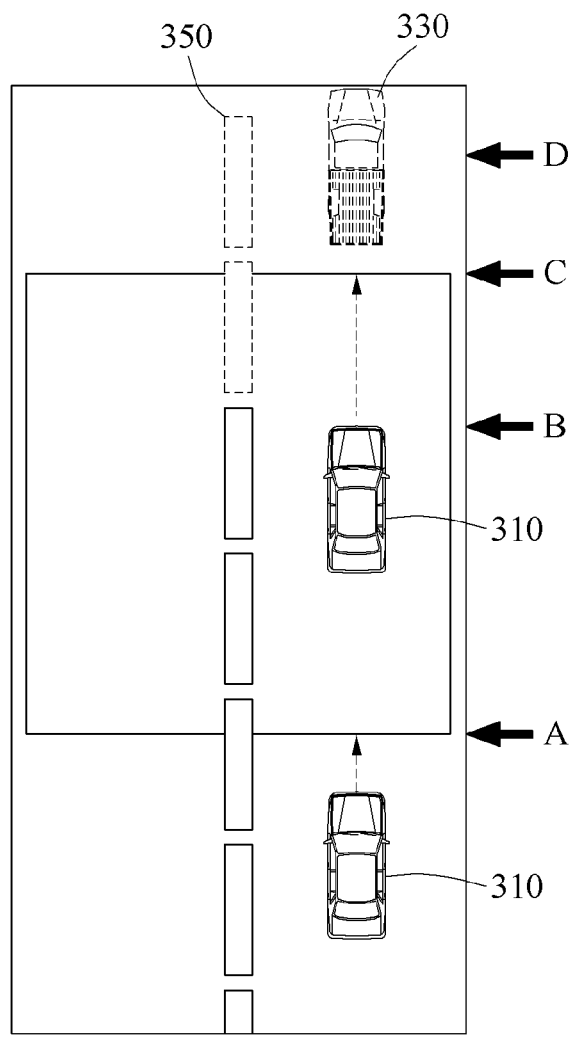
FIG. 3 illustrates an example of a method to recognize an entry point and an exit point of a tunnel.

FIG. 3 illustrates an example of a method to recognize an entry point or an exit point of a tunnel. In FIG. 3, a host vehicle may move to points, locations, or positions A, B, C and D inside and outside the tunnel during autonomous driving.

The points A, B, C and D correspond to an entrance, an inside, an exit and an outside of the tunnel, respectively. In other words, the tunnel is defined by points A and C. Operations of the host vehicle 310 at the points A, B, C and D are described below. In the following description, the host vehicle 310 is understood as a hosting apparatus 310 including a control apparatus.

Before entering the point A, the host vehicle 310 recognizes the entrance of the tunnel from an image captured by the vision sensor in the host vehicle 310, map data associated with a traveling path of the host vehicle 310, and/or GPS coordinates corresponding to a current location of the host vehicle 310 during traveling. In an example, the host vehicle 310 recognizes the entry point to the tunnel based on whether the image captured by the vision sensor includes a predetermined shape (for example, a semicircular shape) associated with the entrance of the tunnel. In another example, the host vehicle 310 recognizes the entry point to the tunnel based on whether the image captured by the vision sensor includes shapes of the entry point corresponding to different illumination variations for daytime or nighttime. Examples of the shapes of the entry point corresponding to the different illumination variations will be described with reference to FIG. 4.

In still another example, the host vehicle 310 recognizes the entrance to the tunnel based on the map data and the GPS coordinates. In this example, the host vehicle 310 acquires GPS coordinates that indicate the entrance. The host vehicle 310 recognizes the entrance as a position, location or point that is closest to the GPS coordinates from the map data.

When the entrance of the tunnel is recognized, the host vehicle 310 predicts the point A as a point at which an illumination variation is expected. The host vehicle 310 controls the vision sensor in advance using a software scheme or a hardware scheme. Thus, a recognition performance of the vision sensor in the tunnel may be enhanced.

The host vehicle 310 increases a value of a photosensitivity (for example, an International Organization for Standardization (ISO)) of the vision sensor prior to reaching the entrance of the tunnel, to robustly recognize an object and a lane, even though a light intensity suddenly decreases in response to entering the tunnel. Also, the host vehicle 310 increases, in stages, points, periods, or steps in a process of increasing the value of the photosensitivity based on a distance between the host vehicle 310 and the entrance. Also, the host vehicle 310 attaches or detaches a hardware filter to or from the vision sensor, instead of adjusting the value of the photosensitivity. A method of controlling a vision sensor will be described below.

When the host vehicle 310 is located at the point B, it is impossible to receive GPS coordinates in the tunnel. The host vehicle 310 recognizes the exit based on the image captured by the vision sensor, the map data and a traveling speed of the host vehicle 310.

When the host vehicle 310 travels from the point B toward the exit, the host vehicle 310 recognizes the exit based on image data acquired by capturing a front side using the vision sensor. For example, the host vehicle 310 recognizes the exit based on whether an image captured at the point B by the vision sensor includes a shape (for example, a semicircular shape) associated with the exit.

The host vehicle 310 recognizes the exit point of the tunnel based on whether the image captured by the vision sensor includes shapes of the exit point corresponding to different illumination variations for daytime or nighttime. Examples of the shapes of the exit point corresponding to the different illumination variations will be described with reference to FIG. 5.

Also, the host vehicle 310 recognizes the exit point of the tunnel based on map data matching the entrance to the tunnel and the traveling speed of the host vehicle 310. For example, the host vehicle 310 determines a total length of a road in the tunnel based on map data. The host vehicle 310 calculates a movement or a travel distance from the entrance by the traveling speed, determines a location of the host vehicle 310 in the tunnel, and recognizes the exit based on the determined location. The traveling speed is measured using a speed sensor or an acceleration sensor.

Figure 4:
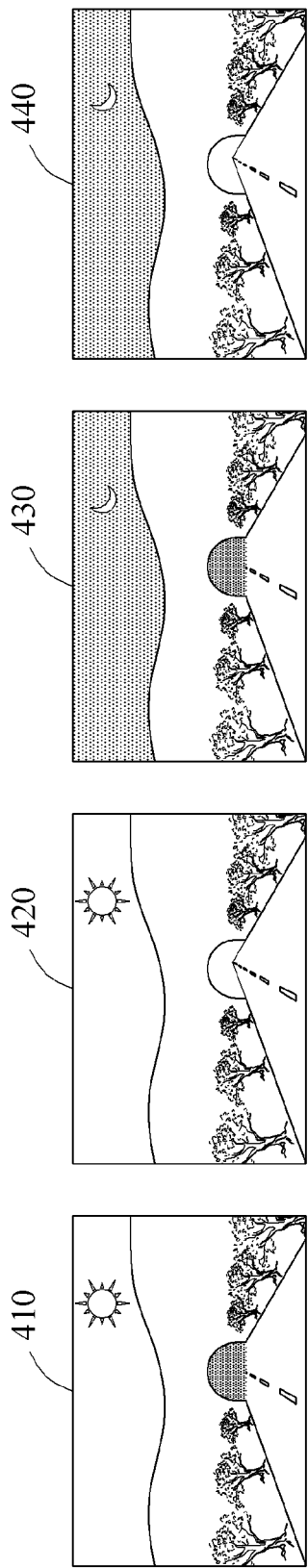
FIG. 4 illustrates examples of shapes of an entry point of a tunnel during different time slots and different illumination environments.

When an image is captured at the exit point of the tunnel, the host vehicle 310 may not correctly recognize yellow broken lines 350 defining a boundary between lanes and may not correctly recognize a counterpart vehicle 330 that is traveling in a vicinity of the exit, due to a backlight effect caused by a difference in illumination from behind of the host vehicle produced by other vehicles, lights inside the tunnel, or illumination within the tunnel environment and the sun outside the tunnel or darkness outside the tunnel. Thus, when there is sun outside the tunnel, the host vehicle 310 reduces the value of the photosensitivity of the vision sensor prior to reaching the exit or the exit point of the tunnel, to robustly recognize the counterpart vehicle 330 and the lane 350, even though the light intensity suddenly increases in response to reaching the exit of the tunnel. Also, the host vehicle 310 reduces, in stages, the value of the photosensitivity based on a distance between the host vehicle 310 and the exit or the exit point. In contrast, when it is night-time and there is darkness outside the tunnel, the host vehicle 310 increases the value of the photosensitivity of the vision sensor prior to reaching the exit or the exit point of the tunnel, to robustly recognize the counterpart vehicle 330 and the lane 350, even though the light intensity suddenly decreases in response to reaching the exit of the tunnel. Also, the host vehicle 310 increases, in stages, the value of the photosensitivity based on a distance between the host vehicle 310 and the exit or the exit point. FIG. 4 illustrates examples of shapes of an entry point of a tunnel during different time slots and different illumination environments. FIG. 4 illustrates images 410, 420, 430 and 440 corresponding to different illumination variations during daytime or nighttime.

The image 410 represents a shape of the entry point when the tunnel is dark and a host vehicle travels toward the entry point during the daytime. For example, when the image 410 is recognized, a light intensity may suddenly vary between an inside and an outside of the tunnel. In this example, a control apparatus in the host vehicle controls a vision sensor based on a variation in the light intensity, to robustly recognize an object and a lane in the tunnel. The control apparatus adjusts a level of the variation based on a brightness of a lighting in the tunnel.

The image 420 represents a shape of the entry point when the tunnel is bright and the host vehicle travels toward the entry point during the daytime. When the image 420 is recognized, the control apparatus may not need to separately control the light intensity because the light intensity slightly varies between the inside and outside of the tunnel.

The image 430 represents a shape of the entry point when the tunnel is dark and the host vehicle travels toward the entry point during the nighttime. When the image 430 is recognized, the control apparatus may not need to separately control the light intensity because the light intensity slightly varies between the inside and outside of the tunnel.

The image 440 represents a shape of the entry point when the tunnel is bright and the host vehicle travels toward the entry point during the nighttime. For example, when the image 440 is recognized, the light intensity varies between the inside and outside of the tunnel. In this example, the control apparatus controls the vision sensor based on a variation in the light intensity, to robustly recognize an object and a lane in the tunnel. The control apparatus adjusts a level of the variation based on a brightness of a lighting in the tunnel.

Figure 5:
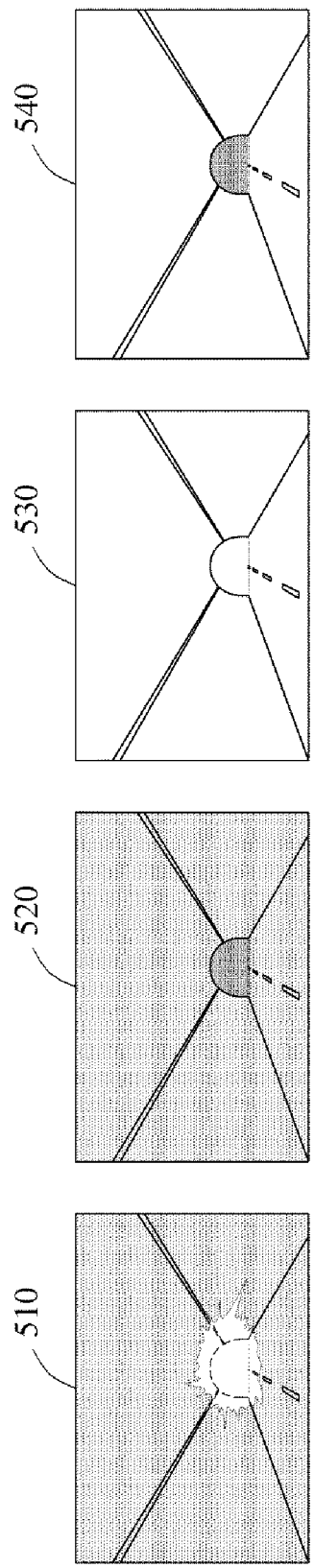
FIG. 5 illustrates examples of shapes of an exit point of a tunnel during different time slots and different illumination environments.

FIG. 5 illustrates examples of shapes of an exit point of a tunnel during different time slots and different illumination environments. FIG. 5 illustrates images 510, 520, 530 and 540 corresponding to different illumination variations during daytime or nighttime.

The image 510 represents a shape of the exit point when the tunnel is dark and a host vehicle travels toward the exit point of the tunnel during the daytime. For example, when the image 510 is recognized, a light intensity suddenly varies between an inside and outside of the tunnel. In this example, a control apparatus in the host vehicle controls a vision sensor in the host vehicle based on a variation in the light intensity, to robustly recognize an object and a lane outside the tunnel. The control apparatus adjusts a level of the variation based on a variation in the light intensity in a vicinity of the exit point.

The image 520 represents a shape of the exit point when the tunnel is dark and the host vehicle travels toward the exit point at nighttime. When the image 520 is recognized, the control apparatus does not need to separately control the light intensity because the light intensity slightly varies between the inside and outside of the tunnel.

The image 530 represents a shape of the exit point when the tunnel is bright and the host vehicle travels toward the exit point of the tunnel during the daytime. When the image 530 is recognized, the control apparatus does not need to separately control the light intensity because the light intensity slightly varies between the inside and outside of the tunnel.

The image 540 represents a shape of the exit point when the tunnel is bright and a host vehicle travels toward the exit point during the nighttime. When the image 540 is recognized, the light intensity suddenly varies between the inside and outside of the tunnel. The control apparatus controls the vision sensor based on a variation in the light intensity, to recognize an object and a lane in the tunnel.

According to the examples, the control apparatus predicts a point at which an illumination variation is expected using a vision sensor instead of using a separate illumination sensor based on a model that is trained on images representing shapes of an entry point and an exit point of a tunnel, in various time slots and various illumination environments. The control apparatus adjusts a level of the illumination variation of the vision sensor.

Figure 6:
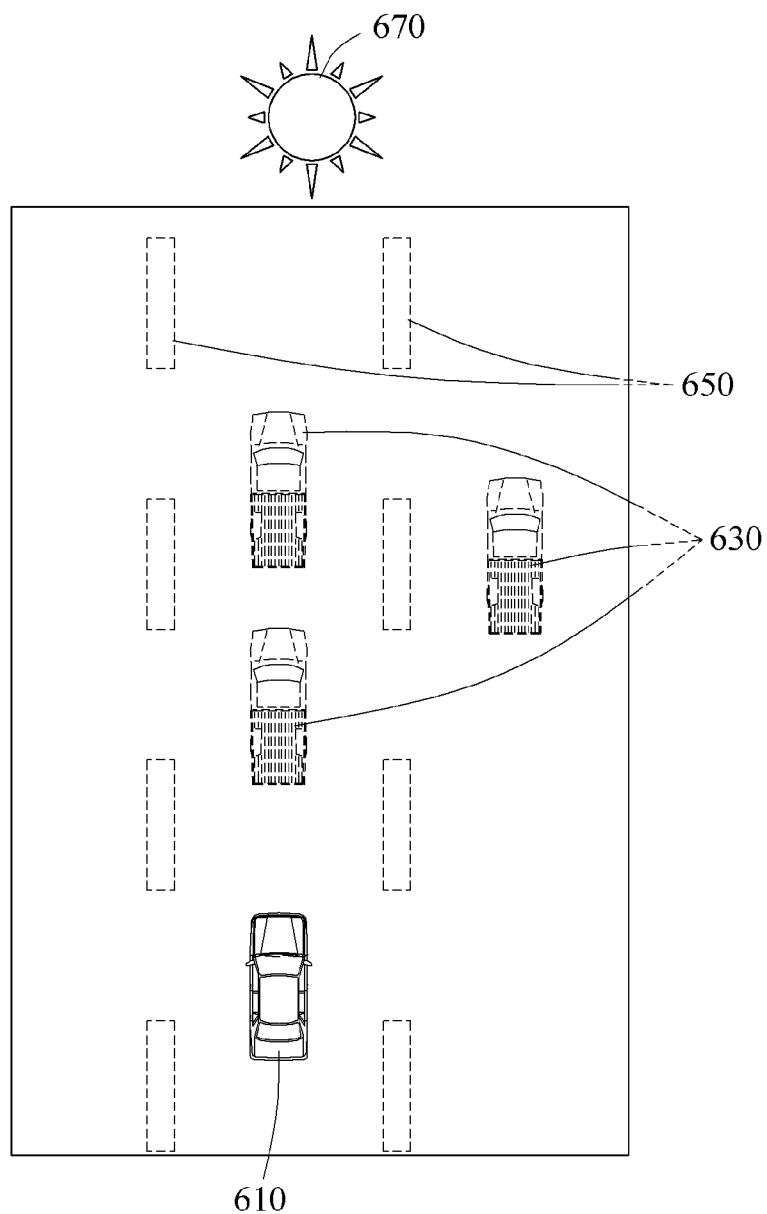
FIG. 6 illustrates an example in which a host vehicle is exposed to a backlight environment.

FIG. 6 illustrates an example in which a host vehicle is exposed to a backlight environment. In FIG. 6, because a sun 670 is in front of a host vehicle 610 that is traveling on a road, a counterpart vehicle 630 and a lane 650 on the road are not correctly recognized.

As previously stated, the backlight environment refers to an environment in which an image of an object is blurred due to direct incident light from the sun on a vision sensor of the host vehicle, in addition to light reflected from a subject to be captured. In the backlight environment, it is difficult to correctly recognize captured objects.

A control apparatus in the host vehicle determines whether the host vehicle is exposed to the backlight environment, and determines a location of the host vehicle as a point at which an illumination variation is expected based on a determination result.

In an example, when a light intensity measured by an illumination sensor is greater than or equal to a threshold associated with the backlight environment, the control apparatus determines that the host vehicle is exposed to the backlight environment. When the host vehicle is determined to be exposed to the backlight environment, the control apparatus determines a current location of the host vehicle as a point at which an illumination variation is expected, and controls the vision sensor.

In another example, when an angle of incidence of the sun and a direction of the vision sensor are denoted by A and C, respectively, and when a difference between the angle A and the direction C is less than a preset angle (for example, 90°), the control apparatus determines that the direction C is currently included in a backlight area. When "C−90°<A<C+90°" or "|A−C|<90°" is satisfied in a relationship between the angle A and the direction C, the vision sensor is determined to face light in a capturing direction. When the host vehicle is determined to be exposed to the backlight environment, the control apparatus determines a current location of the host vehicle as a point at which an illumination variation is expected, and controls the vision sensor.

In still another example, when an object detected during daylight is recognized from an image captured by the vision sensor, the control apparatus determines that the host vehicle is exposed to the backlight environment. The object detected during daylight includes, for example, a sun appearing in an environment 710 or a reflector that reflects the sun in an environment 720 as shown in FIG. 7.

FIG. 7 illustrates examples of backlight environments. In the environment 710, the sun is used as backlight. In the environment 720, a light being reflected is used as backlight, for example, the light from the sun that is reflected on a surface of a glass wall of a building.

A control apparatus in a host vehicle compares an image captured by a vision sensor to a model trained on an image in a backlight state and determines that the host vehicle is exposed to a backlight environment, even though an illumination sensor is not provided. When the host vehicle is determined to be exposed to the backlight environment, the control apparatus applies a filter to a vision sensor or performs a backlight compensation algorithm, for example, that adjusts of a value of a photosensitivity (for example, an ISO) of the vision sensor. When the backlight compensation algorithm is performed, the host vehicle is applied to a model of an autonomous driving mode.

To determine whether the host vehicle is exposed to the backlight environment, the control apparatus uses, for example, an image processing scheme, such as a histogram analysis or a deep learning scheme, to create a model trained on image data representing a backlight state.

As described above, the control apparatus controls an exposure of the vision sensor or a filter for the vision sensor, to allow captured objects to be more clearly recognized.

Figure 8:
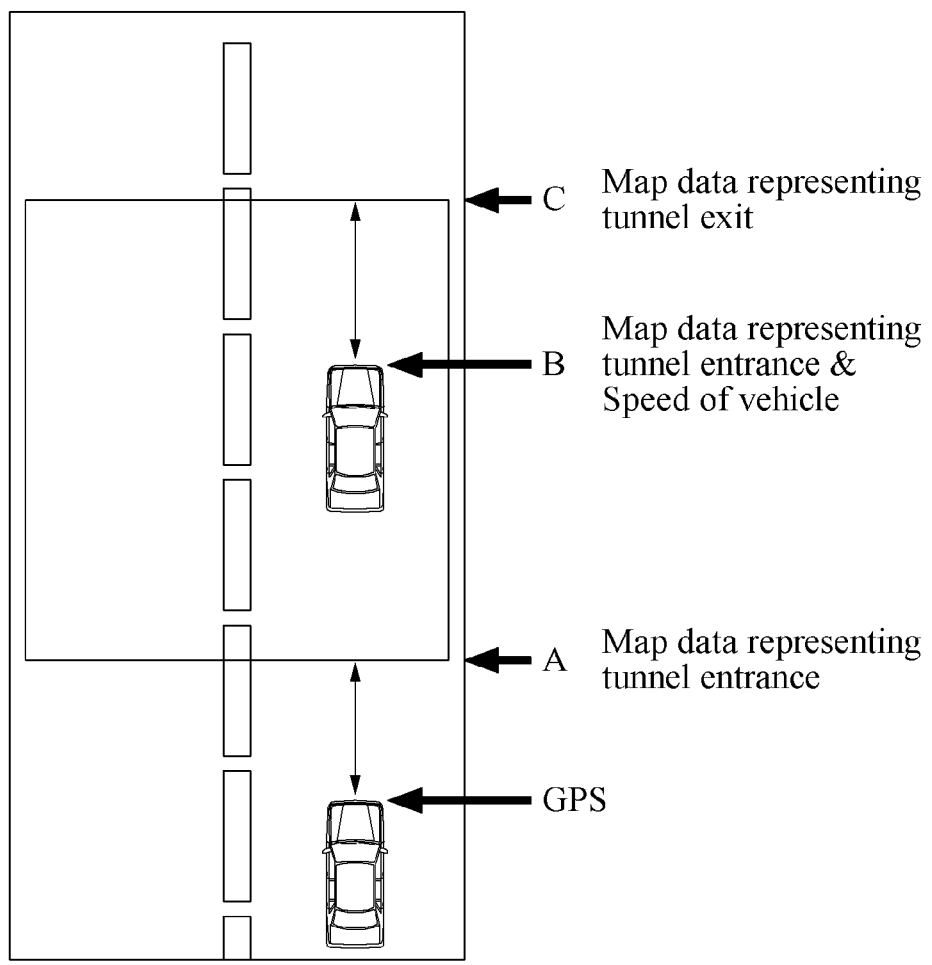
FIG. 8 illustrates an example of a method to determine whether a host vehicle is located within a threshold distance.

FIG. 8 illustrates an example of a method to determine whether a host vehicle is located within a threshold distance. In FIG. 8, the host vehicle approaches points A and C. The points A and C are an entrance and an exit of a tunnel, respectively.

A control apparatus in the host vehicle predicts a distance between the host vehicle and the entrance of the tunnel using a GPS sensor based on map data representing the entrance to the tunnel. The control apparatus determines whether a distance between the host vehicle and either the entrance of the tunnel or at least one of the entry point or the exit point as an expected point, at which an illumination variation is expected to occur, is within a threshold distance to control a vision sensor of the host vehicle. The control apparatus determines that the host vehicle is located within the threshold distance from the entrance or the expected point, and controls the vision sensor.

The threshold distance changes based on a traveling speed of the host vehicle. For example, when the traveling speed increases, a time to reach the expected point decreases, which leads to an increase in the threshold distance.

The control apparatus predicts a location of the host vehicle in the tunnel based on the traveling speed and map data matching based on the entrance, calculates a remaining distance to the exit, and determines whether the host vehicle is located within the threshold distance.

FIG. 9 illustrates another example of a method to determine whether a host vehicle is located within a threshold distance. When the host vehicle travels toward an entry point of a tunnel, different images, for example, images 910 and 920, are captured based on a distance to the entry point as shown in FIG. 9.

The image 910 is captured when the host vehicle is located far away from an expected point (for example, the entry point) at which an illumination variation is expected. The image 920 is captured when the host vehicle moves closer to the expected point at, for example, a constant traveling speed.

The images 910 and 920 have different depth values based on a distance between the host vehicle and the expected point.

A control apparatus in the host vehicle calculates a depth value corresponding to the expected point based on the images 910 and 920 captured by a vision sensor in the host vehicle, and determines, based on the depth value, whether the host vehicle is located within the threshold distance. For example, when the host vehicle travels toward a dark tunnel during daytime, and when a depth value corresponding to an entry point of the tunnel between images 910 and 920 gradually decreases to a predetermined value, the control apparatus determines that the host vehicle enters a threshold distance for the entry point.

When the host vehicle travels from an inside of a tunnel to an exit of the tunnel, the control apparatus calculates a depth value corresponding to an exit point of the tunnel based on an image captured by the vision sensor.

Figure 10:
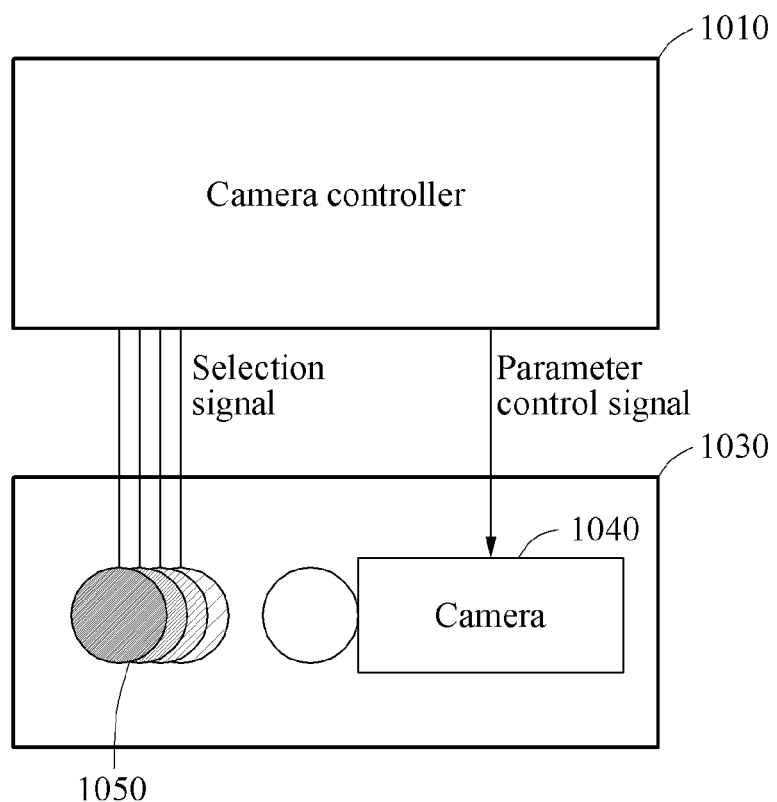
FIG. 10 illustrates an example of a method to control the vision sensor based on an illumination variation.

FIG. 10 illustrates an example of a method to control the vision sensor based on an illumination variation. Referring to FIG. 10, a control apparatus includes a camera controller 1010 and a camera module 1030. The camera module 1030 includes a camera 1040 and a filter 1050. The camera 1040 corresponds to various capturing devices, for example, a vision sensor.

As described above, the control apparatus controls the vision sensor based on an expected illumination variation using a software scheme and/or a hardware scheme. To control the vision sensor using the software scheme, the control apparatus controls a sensing parameter (for example, a value of a photosensitivity, for example, an ISO) of the camera 1040 or processes an image captured by the vision sensor.

The camera controller 1010 transmits a parameter control signal to the camera 1040 based on a determination of whether the host vehicle is located within a threshold distance from a point at which an illumination variation is expected. For example, when an illumination variation is expected at an entry point of a tunnel, the camera controller 1010 transmits a control signal to increase a value of a photosensitivity of the camera 1040. When the host vehicle is located within the threshold distance from an exit point of the tunnel, the camera controller 1010 transmits a control signal to decrease the value of the photosensitivity of the camera 1040.

The control apparatus processes an image captured by the camera 1040 by performing high dynamic range imaging (HDRI) of the image through tone mapping. The HDRI is used to perform backlight compensation by synthesizing a plurality of images with different degrees of light exposure. Also, the control apparatus processes the image captured by the camera 1040 by applying an image processing algorithm, for example, a histogram equalization.

To control the vision sensor using the hardware scheme, the camera controller 1010 determines whether to use the filter 1050 for the vision sensor. The filter 1050 includes various filters, for example, a circular polarizing (CPL) filter or neutral density (ND) filters (for example, ND 3 and ND8). The camera controller 1010 transmits, to the filter 1050, a selection signal to attach or detach an appropriate filter based on an illumination variation among various filters to adjust a degree of exposure of the camera 1040.

In an example, when an illumination variation is expected at an entry point of a tunnel, the control apparatus transmits a signal to detach a filter from the camera 1040 to the camera controller 1010. In another example, when an illumination variation is expected at an exit point of a tunnel, the control apparatus transmits a signal to attach a new filter to the camera 1040 to the camera controller 1010.

When a sudden illumination variation is sensed or detected, the control apparatus automatically changes the filter 1050 using the camera controller 1010 based on an amount of illumination variation.

Thus, the control apparatus predicts a point (or an unrecognizable point) at which an illumination variation greater than or equal to a threshold is predicted based on sensor information or through recognition, and controls the camera 1040 using, for instance, a software control scheme. When an illumination variation that is uncontrollable using the software control scheme is expected, the control apparatus adjusts a light intensity by reducing a degree of exposure of lenses of the camera 1040 using the filter 1050 based on, for instance, a hardware control scheme.

Figure 11:
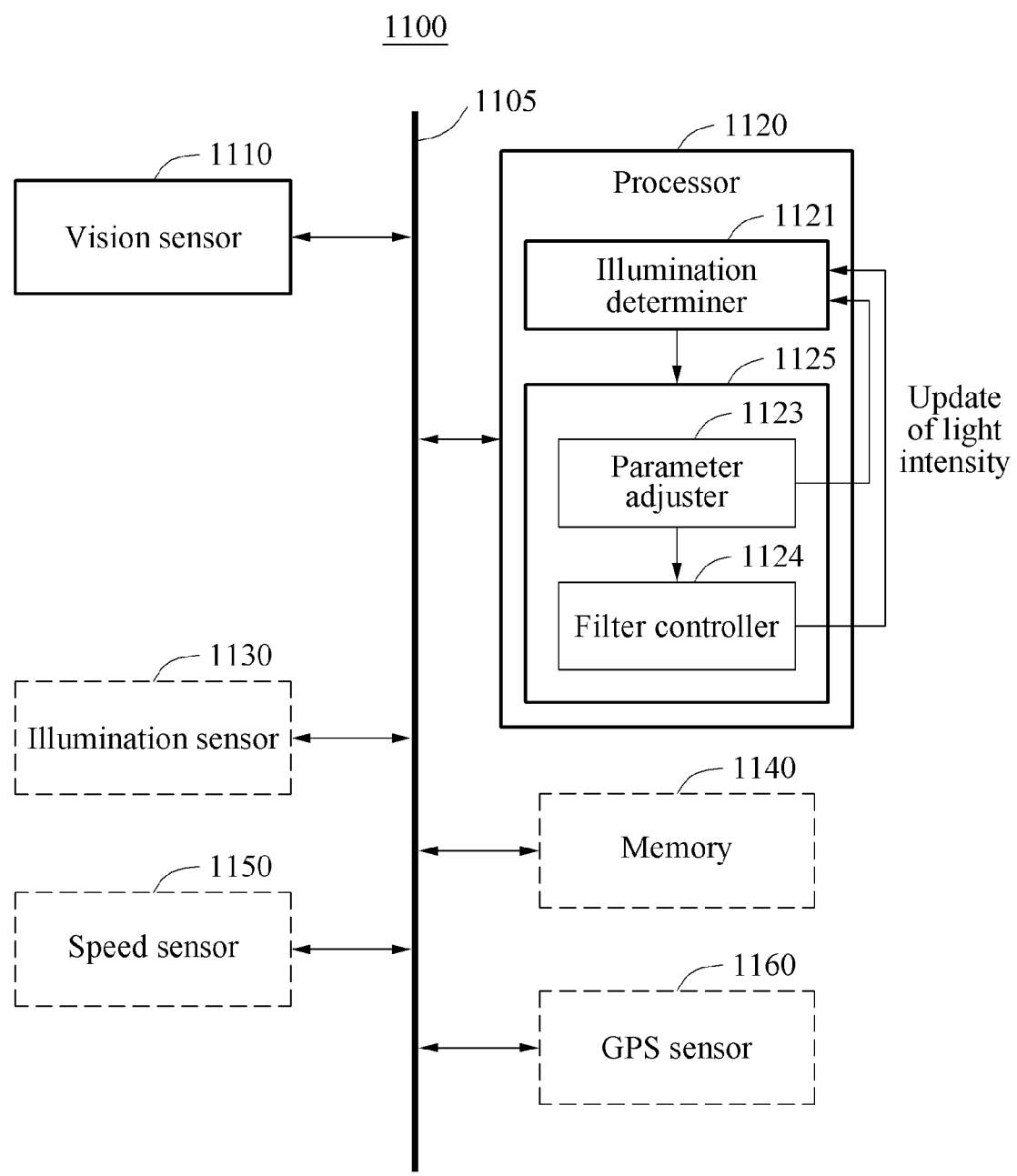
FIG. 11 is a block diagram illustrating an example of an apparatus to control the vision sensor.

FIG. 11 is a block diagram illustrating an example of a control apparatus 1100. Referring to FIG. 11, the control apparatus 1100 includes a vision sensor 1110 and a processor 1120. Depending on examples, the control apparatus 1100 further includes an illumination sensor 1130, a memory 1140, a speed sensor 1150, and a GPS sensor 1160. The vision sensor 1110, the processor 1120, the illumination sensor 1130, the memory 1140, the speed sensor 1150, and the GPS sensor 1160 are connected to each other via a communication bus 1105.

The vision sensor 1110 captures an object appearing on a traveling path of a host vehicle.

The processor 1120 predicts an expected point at which an illumination variation greater than or equal to a threshold is expected, along the traveling path of the host vehicle. The processor 1120 determines whether the host vehicle is located within a threshold distance to control the vision sensor 1110 from the expected point. The processor 1120 controls the vision sensor 1110 based on the expected illumination variation based on a determination that the host vehicle is located within the threshold distance.

The processor 1120 includes an illumination determiner 1121 and a controller 1125. The illumination determiner 1121 determines whether the vision sensor 1110 is to be controlled by the controller 1125 based on a result obtained from determining a light intensity. The controller 1125 includes a parameter adjuster 1123 and a filter controller 1124.

The parameter adjuster 1123 generates a control signal to adjust parameters of the vision sensor 1110. The parameter adjuster 1123 is configured to control the vision sensor 1110. The filter controller 1124 generates a signal to control whether to detach a filter for the vision sensor 1110. The filter controller 1124 is also configured to control the vision sensor 1110. In one non-limiting illustrative example, the parameter adjuster 1123 controls the vision sensor 1110 using a software scheme and the filter controller 1124 controls the vision sensor 1110 using a hardware scheme.

The processor 1120 is a structural hardware apparatus configured to perform at least one of the methods described above with reference to FIGS. 1 through 10. The processor 1120 executes a program and controls the control apparatus 1100. A program code executed by the processor 1120 is stored in the memory 1140.

The illumination sensor 1130 senses a light intensity in a current state or a present state. In an example, when a light intensity measured by the illumination sensor 1130 is greater than or equal to a threshold associated with a backlight environment, the processor 1120 determines that the host vehicle is exposed to the backlight environment. In another example, when an object detected during daylight is recognized from an image captured by the vision sensor 1110, the processor 1120 determines that the host vehicle is exposed to the backlight environment. In still another example, when a light intensity measured by the illumination sensor 1130 is greater than or equal to a threshold associated with a backlight environment and when an object detected during daylight is recognized from an image captured by the vision sensor 1110, the processor 1120 determines that the host vehicle is exposed to the backlight environment.

The memory 1140 stores map data associated with the traveling path of the host vehicle. The memory 1140 stores a variety of information generated in a processing process performed by the processor 1120. Also, the memory 1140 stores information received via a transmission and reception interface (not shown).

The memory 1140 stores a variety of data and programs. The memory 1140 includes, for example, a volatile memory or a nonvolatile memory. The memory 1140 includes a mass storage medium, for example, a hard disk, and stores a variety of data. For example, the memory 1140 stores map data using at least one hard disk.

The speed sensor 1150 senses a traveling speed of the host vehicle. The GPS sensor 1160 measures GPS coordinates corresponding to a current location of the host vehicle during traveling.

The processor 1120 predicts the expected point based on at least one of an image captured by the vision sensor 1110, the map data stored in the memory 1140, the GPS coordinates measured by the GPS sensor 1160, or the traveling speed sensed by the speed sensor 1150.

The control apparatus 1100 is, for example, a host vehicle or an autonomous vehicle or a separate device included in the host vehicle or the autonomous vehicle.

The camera module 1030, camera controller 1010, the camera 1040, the filter 1050, vision sensor 1110, the illumination determiner 1121, the parameter adjuster 1123, the filter controller 1124, the illumination sensor 1130, the speed sensor 1150, the memory 1140, the GPS sensor 1160, and the processor 1120 in FIGS. 10 and 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 2 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling a vision sensor of a host vehicle, the method comprising:
    capturing an image of a traveling path of the host vehicle while the host vehicle travels on the traveling path using the vision sensor;
    predicting based on analyzing shapes of objects within the image an expected point, on the traveling path of the host vehicle, at which an illumination variation of an external environment on the traveling path of the host vehicle greater than or equal to a threshold is expected to occur;
    determining that the host vehicle is located within a threshold distance from the expected point; and
    controlling the vision sensor in the host vehicle to adjust an image capture parameter of the vision sensor based on the expected illumination variation in response to determining that the host vehicle is located within the threshold distance from the expected point,
    wherein the determining that the host vehicle is located within the threshold distance from the expected point comprises:
        identifying an object associated with the expected point among the objects within the image;
        obtaining global positioning system (GPS) coordinates of the object using GPS coordinates of a current location of the host vehicle and map data of the traveling path;
        determining a distance between the GPS coordinates of the object and the GPS coordinates of the current location of the host vehicle; and
        determining that the host vehicle is located within the threshold distance from the expected point based on the distance between the GPS coordinates of the object and the GPS coordinates of the current location of the host vehicle being less than the threshold distance.

2. The method of claim 1, wherein the predicting of the expected point comprises predicting the expected point based on any one or any combination of any two or more of the image captured by the vision sensor, the map data of the traveling path, global positioning system (GPS) coordinates of the current location of the host vehicle during traveling, and a traveling speed of the host vehicle.

3. The method of claim 1, wherein the predicting of the expected point comprises predicting the expected point based on a similarity between the image captured by the vision sensor and a pre-trained image representing the expected point.

4. The method of claim 1, wherein the predicting of the expected point comprises:
    recognizing either one or both of an entry point and an exit point of a tunnel on the traveling path; and
    predicting either one or both of the entry point and the exit point as the expected point.

5. The method of claim 4, wherein the recognizing of either one or both of the entry point and the exit point comprises either one or both of:
    recognizing the entry point based on any one or any combination of any two or more of the map data of the traveling path and the GPS coordinates of the current location of the host vehicle during traveling; and
    recognizing the exit point based on any one or any combination of any two or more of the map data and a traveling speed of the host vehicle.

6. The method of claim 5, wherein the recognizing of the entry point comprises either one or both of:
recognizing the entry point based on whether the image comprises a predetermined shape of an entrance of the tunnel; and
recognizing the entry point based on the map data and the GPS coordinates.

7. The method of claim 5, wherein the recognizing of the exit point comprises either one or both of:
recognizing the exit point based on whether the image comprises a predetermined shape of an exit of the tunnel; and
recognizing the exit point based on map data matching based on the entry point and the traveling speed.

8. The method of claim 1, wherein the determining of whether the host vehicle is located within the threshold distance comprises:
calculating a depth value of the expected point based on an image captured by the vision sensor; and
determining, based on the depth value, whether the host vehicle is located within the threshold distance.

9. The method of claim 1, wherein the determining that the host vehicle is located within the threshold distance from the expected point based on the distance between the GPS coordinates of the object and the GPS coordinates of the current location of the host vehicle being less than the threshold distance comprises determining that the host vehicle is located within the threshold distance from the expected point based on the distance between the GPS coordinates of the object and the GPS coordinates of the current location of the host vehicle being less than the threshold distance and based on a traveling speed of the host vehicle.

10. The method of claim 1, wherein the controlling of the vision sensor comprises any one or any combination of any two or more of:
controlling a sensing parameter of the vision sensor;
processing an image captured by the vision sensor; and
determining whether to use a filter for the vision sensor.

11. The method of claim 10, wherein the object is a tunnel, wherein the expected point is an entry point of the tunnel or an exit point of the tunnel, and
wherein the controlling the vision sensor to adjust the image capture parameter comprises:
increasing, in stages, a value of a photosensitivity of the vision sensor as the distance between the GPS coordinates of the entry point of the tunnel and the GPS coordinates of the current location of the host vehicle decreases; and
reducing, in stages, the value of the photosensitivity of the vision sensor as the distance between the GPS coordinates of the exit point of the tunnel and the GPS coordinates of the current location of the host vehicle decreases.

12. The method of claim 1, wherein the controlling comprises performing high dynamic range imaging (HDRI) of the image through tone mapping.

13. The method of claim 1, wherein the object is a tunnel, wherein the expected point comprises an entry point of the tunnel or an exit point of the tunnel, and
wherein the controlling the vision sensor to adjust the image capture parameter comprises:
detaching a filter from the vision sensor in response to determining that the host vehicle is located within the threshold distance from the entry point of the tunnel based on the distance between the GPS coordinates of the entry point of the tunnel and the GPS coordinates of the current location of the host vehicle being less than the threshold distance; and
attaching the filter to the vision sensor in response to determining that the host vehicle is located within the threshold distance from the exit point of the tunnel based on the distance between the GPS coordinates of the exit point of the tunnel and the GPS coordinates of the current location of the host vehicle being less than the threshold distance.

14. The method of claim 1, wherein the predicting of the expected point comprises:
determining whether the host vehicle is exposed to a backlight environment; and
determining a location of the host vehicle as the expected point based on a result of the determining.

15. The method of claim 14, wherein the determining of whether the host vehicle is exposed to the backlight environment comprises either one or both of:
determining that the host vehicle is exposed to the backlight environment in response to a light intensity measured by an illumination sensor being greater than or equal to a threshold of the backlight environment; and
determining that the host vehicle is exposed to the backlight environment in response to an object during daylight being recognized from an image captured by the vision sensor.

16. A non-transitory computer-readable storage medium storing instructions that, when executed by a processor, cause the processor to perform the method of claim 1.

17. An apparatus for controlling a vision sensor of a host vehicle, the apparatus comprising:
a processor configured to:
capture an image of a traveling path of the host vehicle while the host vehicle travels on the traveling path using the vision sensor of the host vehicle;
predict based on analyzing shapes of objects within the image an expected point, on the traveling path of the host vehicle, at which an illumination variation of an external environment on the traveling path of the host vehicle greater than or equal to a threshold is expected to occur,
determine that the host vehicle is located within a threshold distance from the expected point, and
control the vision sensor in the host vehicle to adjust an image capture parameter of the vision sensor based on the expected illumination variation in response determining that to the host vehicle is located within the threshold distance from the expected point,
wherein
the processor determining that the host vehicle is located within the threshold distance from the expected point is further configured to:
identify an object associated with the expected point among the objects within the image;
obtain global positioning system (GPS) coordinates of the object using GPS coordinates of a current location of the host vehicle and map data of the traveling path;
determine a distance between the GPS coordinates of the object and the GPS coordinates of the current location of the host vehicle; and
determine that the host vehicle is located within the threshold distance from the expected point based on the distance between the GPS coordinates of the object and the GPS coordinates of the current location of the host vehicle being less than the threshold distance.

18. The apparatus of claim 17, further comprising:
a memory configured to store the map data of the traveling path;
a global positioning system (GPS) sensor configured to measure GPS coordinates of the current location of the host vehicle during traveling; and
a speed sensor configured to sense a traveling speed of the host vehicle,
wherein the processor is further configured to predict the expected point based on any one or any combination of any two or more of the map data, the GPS coordinates, and the traveling speed.

19. The apparatus of claim 17, wherein the processor is further configured to predict the expected point based on a similarity between the image captured by the vision sensor and a pre-trained image representing the expected point.

20. The apparatus of claim 17, wherein the processor is further configured to recognize either one or both of an entry point and an exit point of a tunnel on the traveling path and to predict either one or both of the entry point and the exit point as the expected point.

21. The apparatus of claim 20, wherein the processor is further configured to perform either one or both of:
recognizing the entry point based on any one or any combination of any two or more of the map data of the traveling path and GPS coordinates of the current location of the host vehicle during traveling; and
recognizing the exit point based on any one or any combination of any two or more of the map data and a traveling speed of the host vehicle.

22. The apparatus of claim 21, wherein the processor is further configured to perform either one or both of:
recognizing the entry point based on whether the image comprises a predetermined shape of an entrance of the tunnel; and
recognizing the entry point based on the map data and the GPS coordinates.

23. The apparatus of claim 21, wherein the processor is further configured to perform either one or both of:
recognizing the exit point based on whether the image comprises a predetermined shape of an exit of the tunnel; and
recognizing the exit point based on map data matching based on the entry point and the traveling speed of the host vehicle.

24. The apparatus of claim 17, wherein the processor is further configured to calculate a depth value of the expected point based on an image captured by the vision sensor, and to determine, based on the depth value, whether the host vehicle is located within the threshold distance.

25. The apparatus of claim 17, wherein the processor determining that the host vehicle is located within the threshold distance from the expected point based on the distance between the GPS coordinates of the object and the GPS coordinates of the current location of the host vehicle being less than the threshold distance is further configured to determine that the host vehicle is located within the threshold distance from the expected point based on the distance between the GPS coordinates of the object and the GPS coordinates of the current location of the host vehicle being less than the threshold distance and based on a traveling speed of the host vehicle.

26. The apparatus of claim 17, wherein the processor is further configured to perform any one or any combination of any two or more of:
controlling a sensing parameter of the vision sensor;
processing an image captured by the vision sensor; and
determining whether to use a filter for the vision sensor.

27. The apparatus of claim 17, wherein the object is a tunnel,
wherein the expected point comprises an entry point of the tunnel or an exit point of the tunnel, and
wherein the processor controlling the vision sensor in the host vehicle to adjust the image capture parameter is further configured to:
increase, in stages, a value of a photosensitivity of the vision sensor as the distance between the GPS coordinates of the entry point of the tunnel and the GPS coordinates of the current location of the host vehicle decreases; and
reduce, in stages, the value of the photosensitivity of the vision sensor of the vision sensor as the distance between the GPS coordinates of the exit point of the tunnel and the GPS coordinates of the current location of the host vehicle decreases.

28. The apparatus of claim 17, wherein the processor is further configured to perform high dynamic range imaging (HDRI) of the image through tone mapping.

29. The apparatus of claim 17, wherein the object is a tunnel,
wherein the expected point is an entry point of the tunnel or an exit point of the tunnel, and
wherein the processor controlling the vision sensor in the host vehicle to adjust the image capture parameter is further configured to:
detach a filter from the vision sensor in response to determining that the host vehicle is located within the threshold distance from the entry point of the tunnel based on the distance between the GPS coordinates of the entry point of the tunnel and the GPS coordinates of the current location of the host vehicle being less than the threshold distance; and
attach the filter to the vision sensor in response to determining that the host vehicle is located within the threshold distance from the exit point of the tunnel based on the distance between the GPS coordinates of the exit point of the tunnel and the GPS coordinates of the current location of the host vehicle being less than the threshold distance.

30. The apparatus of claim 17, wherein the processor is further configured to determine whether the host vehicle is exposed to a backlight environment, and to determine a location of the host vehicle as the expected point based on a result of the determining.

31. The apparatus of claim 30, further comprising:
an illumination sensor configured to sense a light intensity,
wherein the processor is further configured to perform either one or both of:
determining that the host vehicle is exposed to the backlight environment in response to the light intensity measured by the illumination sensor being greater than or equal to a threshold of the backlight environment; and
determining that the host vehicle is exposed to the backlight environment in response to an object during daylight being recognized from an image captured by the vision sensor.

32. A control apparatus of a host vehicle, comprising:
a vision sensor configured to capture an image of a traveling path of the host vehicle; and
a processor configured to:
predict based on analyzing shapes of objects within the image an expected point at which an illumination variation of an external environment on the traveling path of the host vehicle is greater than or equal to a threshold occurs, along the traveling path of the host vehicle, determine that the host vehicle is located within a threshold distance from the expected point, and control the vision sensor to adjust an image capture parameter of the vision sensor based on the illumination variation based on the processor determining that the host vehicle is located within the threshold distance from the expected point, wherein the processor determining that the host vehicle is located within the threshold distance from the expected point is further configured to:

identify an object associated with the expected point among the objects within the image;

obtain global positioning system (GPS) coordinates of the object using GPS coordinates of a current location of the host vehicle and map data of the traveling path;

determine the distance between the GPS coordinates of the object and the GPS coordinates of the current location of the host vehicle; and determine that the host vehicle is located within the threshold distance from the expected point based on the distance between the GPS coordinates of the object and the GPS coordinates of the current location of the host vehicle being less than the threshold distance.

33. The control apparatus of claim 32, wherein the processor compares an image captured by the vision sensor to a pre-trained image trained on an image in a backlight state and determines that the host vehicle is exposed to a backlight environment, without a use of an illumination sensor.

34. The control apparatus of claim 33, wherein, in response to the processor determining that the host vehicle is exposed to the backlight environment, the processor applies a filter to the vision sensor or performs a backlight compensation to adjust a value of a photosensitivity of the vision sensor to adjust the image capture parameter.

35. The control apparatus of claim 32, wherein the processor adjusts a value of a photosensitivity of the vision sensor based on the distance between the GPS coordinates of the object and the GPS coordinates of the current location of the host vehicle to adjust the image capture parameter.

36. The control apparatus of claim 32, wherein the processor comprises:

a controller comprising:

a parameter adjuster configured to generate a control signal to adjust the image capture parameter of the vision sensor, and a filter controller configured to generate a signal to control whether to attach or detach a filter for the vision sensor.

37. The control apparatus of claim 32, wherein the threshold distance is set based on weather conditions or a time of day being daytime or nighttime.

* * * * *